United States Patent
Kraemer et al.

(10) Patent No.: US 9,822,695 B2
(45) Date of Patent: Nov. 21, 2017

(54) ACTUATION DEVICE, IN PARTICULAR ELECTRONIC ACTUATOR

(71) Applicant: BorgWarner Inc., Auburn Hills, MI (US)

(72) Inventors: Jochen Kraemer, Kindenheim (DE); Hans-Joerg Fetzer, Gruenstadt (DE)

(73) Assignee: BorgWarner Inc., Auburn Hills, MI (US)

( * ) Notice: Subject to any disclaimer, the term of this patent is extended or adjusted under 35 U.S.C. 154(b) by 337 days.

(21) Appl. No.: 14/425,668

(22) PCT Filed: Sep. 11, 2013

(86) PCT No.: PCT/US2013/059189
§ 371 (c)(1),
(2) Date: Mar. 4, 2015

(87) PCT Pub. No.: WO2014/046935
PCT Pub. Date: Mar. 27, 2014

(65) Prior Publication Data
US 2015/0226221 A1    Aug. 13, 2015

(30) Foreign Application Priority Data
Sep. 19, 2012    (DE) .................. 10 2012 018 529

(51) Int. Cl.
*F02B 37/18* (2006.01)
*F04D 17/12* (2006.01)
(Continued)

(52) U.S. Cl.
CPC .......... *F02B 37/186* (2013.01); *F04D 17/122* (2013.01); *F04D 27/009* (2013.01); *H01F 7/129* (2013.01); *Y02T 10/144* (2013.01)

(58) Field of Classification Search
CPC ....... F02B 37/186; F04D 27/009; H01F 7/129
See application file for complete search history.

(56) References Cited

U.S. PATENT DOCUMENTS 4,630,445 A    12/1986    Parker
5,063,744 A  * 11/1991    Ishiyama .............. F02B 37/013
                                                          60/600

(Continued)

FOREIGN PATENT DOCUMENTS

KR    20070076772 A    7/2007
KR    20080014780 A    2/2008
KR    20120067475 A    6/2012

OTHER PUBLICATIONS

International Search Report and Written Opinion in International Application No. PCT/US2013/059189 dated Dec. 16, 2013.

*Primary Examiner* — Gregory Anderson
*Assistant Examiner* — Juan G Flores
(74) *Attorney, Agent, or Firm* — Eric L. Doyle; Stephan A. Pendorf; Patent Central LLC

(57) ABSTRACT

An actuation device (1), in particular electronic actuator, having a housing (2); and having an actuation shank which has a first shank portion guided in the housing (2), and which has a second shank portion (3) projecting out of the housing (2), wherein a shielding cap (4) is provided which is fastened to the housing (2) and which surrounds the second shank portion (3) with the exception of a fastening region (5).

18 Claims, 2 Drawing Sheets

(51) Int. Cl.
   *F04D 27/00*   (2006.01)
   *H01F 7/129*   (2006.01)

(56) References Cited

U.S. PATENT DOCUMENTS

| | | | | |
|---|---|---|---|---|
| 5,152,145 A | * | 10/1992 | Miotke | H01F 7/06 |
| | | | | 251/129.04 |
| 2007/0209363 A1 | * | 9/2007 | McEwen | F02B 37/025 |
| | | | | 60/602 |
| 2009/0226304 A1 | | 9/2009 | Frankenstein et al. | |
| 2010/0071435 A1 | * | 3/2010 | Hatano | B21D 39/037 |
| | | | | 72/362 |

* cited by examiner

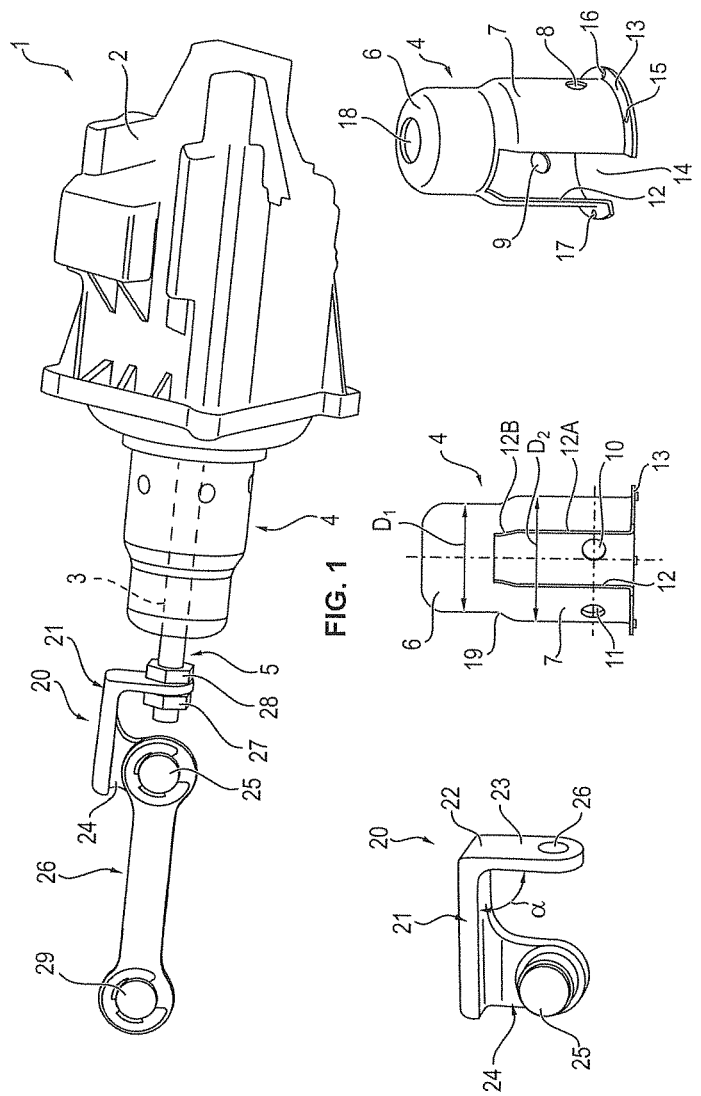

ACTUATION DEVICE, IN PARTICULAR ELECTRONIC ACTUATOR

BACKGROUND OF THE INVENTION

Field of the Invention

The invention relates to an actuation device, in particular in the form of an electronic actuator.

DESCRIPTION OF THE RELATED ART

Such actuation devices are used for example in exhaust-gas turbochargers in order to open and close wastegate flaps. The actuation shank of such actuation devices may warm up owing to high ambient temperatures, such as for example in an engine bay, which firstly can adversely affect the actuation shank itself and secondly can result in an introduction of heat into the housing of the actuation device as a result of heat conduction via the actuation shank.

It is therefore an object of the present invention to provide an actuation device which makes it possible for the actuation shank of the actuation device to be protected against adverse effects of heat.

BRIEF SUMMARY OF THE INVENTION

This object is achieved by the features of claim 1.

The shielding cap of the actuation device according to the invention has the task of forming a heat shield for the actuation shank in order to protect the latter against elevated temperatures from the environment of the actuation device.

Furthermore, the shielding cap advantageously provides protection against possible ingress of relatively large amounts of contaminated water, and also prevents fouling of the actuation shank.

The dependent claims contain advantageous developments of the invention.

The shielding cap (shielding plate) may preferably be provided with cooling bores and/or with water outlet bores.

The construction of the shielding cap according to the invention provides two interconnected cylinder portions which are formed with different diameters and which are connected to one another via a transition region which is preferably of rounded form.

It is also possible for a twist prevention means to be provided such that error-free installation of the shielding cap is possible.

In a further particularly preferred embodiment, a flanged portion is provided on the cylinder portion with the relatively large diameter, which flanged portion serves as an abutment surface and simultaneously for centering the actuation device.

The shielding cap may be fastened, in particular screwed, directly between the actuation device and the actuator bracket. This yields the advantage that no additional fastening means are required.

BRIEF DESCRIPTION OF THE SEVERAL VIEWS OF THE DRAWINGS

Further details, advantages and features of the present invention become apparent from the following description of exemplary embodiments with reference to the drawing, in which:

FIG. 1 shows a perspective illustration of an actuation device according to the invention, FIG. 2 shows a detail illustration of a redirecting device, FIG. 3 shows a front view of a shielding cap, FIG. 4 shows a perspective illustration of the shielding cap as per FIG. 3.

DETAILED DESCRIPTION OF THE INVENTION

Figure 5:
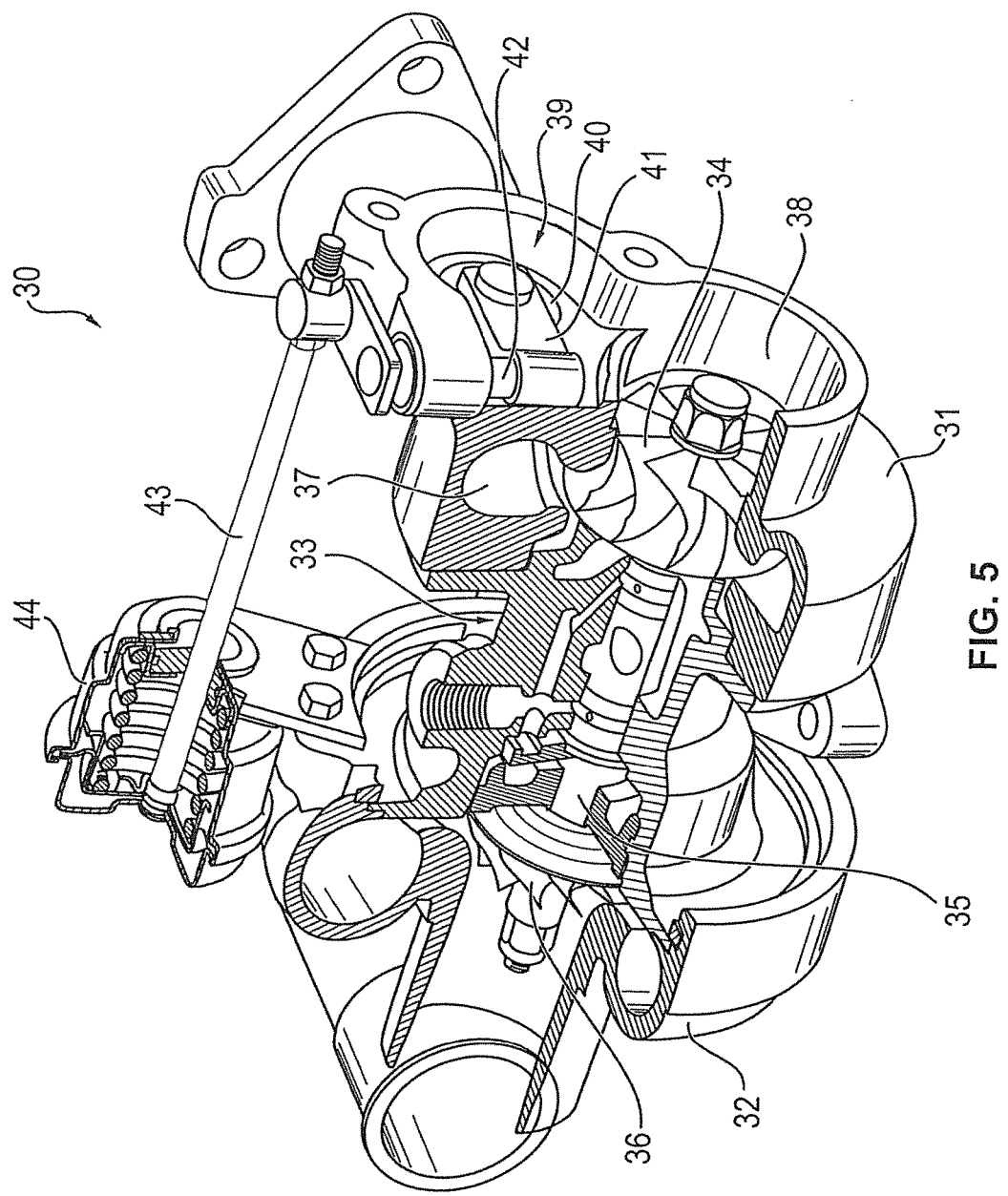
FIG. 5 shows a perspective sectional illustration of a known exhaust-gas turbocharger having an actuator which can be replaced with the actuation device as per FIG. 1 in order to convert the exhaust-gas turbocharger into a turbocharger according to the invention.

FIG. 1 illustrates an actuation device 1 according to the invention which, in the example, is in the form of an electronic actuator (electric actuator).

The electric actuator 1 has a housing 2 in which an actuation shank (not visible in its entirety) is guided by way of a first shank portion. The actuation shank has a second shank portion 3 which projects out of the housing 2 and which is indicated by dashed lines in FIG. 1.

As shown in FIG. 1, said second shank portion 3 is surrounded by a shielding cap 4 which is fastened, in particular screwed, to the housing 2. Here, the second shank portion 3 is, aside from a fastening region 5, covered by the shielding cap 4 in order to prevent an undesired introduction of heat into the shank portion 3.

As shown by FIGS. 3 and 4 in conjunction with FIG. 1, the shielding cap 4 has two interconnected first and second cylinder portions 6 and 7. Here, the cylinder portion 6 has a diameter $D_1$ which is smaller than the diameter $D_2$ of the cylinder portion 7. Here, the cylinder portions 6 and 7 are connected to one another via a rounded transition region 19, wherein the shielding cap 4 is preferably a unipartite component.

As can be seen from a juxtaposition of FIGS. 3 and 4, the shielding cap 4 has cooling and water outlet bores 8, 9, 10 and 11.

In the second cylinder portion 7, there is provided a twist prevention means 12 which is formed as an opening in the second cylinder portion 7. Said opening 12 has a rectangular opening region 12A and, adjoining the latter and adjacent to the first cylinder portion 6, a conically narrowing opening region 12B. As can be seen from a juxtaposition of FIGS. 3 and 4, the opening 12 adjoins an end-side opening 14 of the second cylinder portion 7, said opening being arranged opposite a passage opening 18 of the first cylinder portion 6, through which passage opening the shank portion 3 extends when the shielding cap 4 is in the mounted state, as can be seen in FIG. 1. The shielding cap 4 also has a flanged portion 13 which encircles the end-side opening 14 of the second cylinder portion 7. Said flanged portion 13 is provided with openings, of which the openings 15, 16 and 17 are visible in FIG. 4. Said openings serve for the passage of screws by which the shielding cap 4 can be fastened to the housing 2 of the actuation device 1. In principle, however, other fastening possibilities are also conceivable.

FIGS. 1 and 2 also show that the actuation device 1 according to the invention is provided with a redirecting device 20. Said redirecting device 20 is fixed to the fastening region 5 of the shank portion 3, for which purpose, in the example, the fastening region 5 is provided with an external thread which is not shown in detail in FIG. 1. Onto the external thread of the fastening region 5 there may be screwed two nuts 27 and 28 which, in the mounted state as shown in FIG. 1, engage around a connection plate 23 which is provided with a recess 26 through which the fastening region 5 can be passed, as can be seen in FIG. 1.

The connection plate 23 is arranged on one end side 22 of a central part 21 of the redirecting device 20. As shown in FIG. 2, in the particularly preferred embodiment illustrated therein, a right angle α is enclosed between the central part 21 and the connection plate 23.

Furthermore, the redirecting device 20 has a journal plate 24 which is arranged on a longitudinal side of the central part 21. From this, it can be seen that the plane of the connection plate 23 is rotated through 90° with respect to the plane of the journal plate 24, as can be seen in detail from the illustration of FIG. 2. On the journal plate 24 there is arranged a journal 25 which is preferably of spherical form.

As illustrated in FIG. 1, the journal 25 extends through a connection eyelet of one end of a coupling rod 26 in order to connect the coupling rod 26 to the actuation shank of the electric actuator 1. The eyelet through which the journal 25 extends corresponds to an eyelet 29 arranged on the other end of the coupling rod 26, as can be seen in detail from the illustration of FIG. 1.

By means of the arrangement, explained above, of the connection plate 23 on an end side 22 of the central part 21 and the arrangement, turned through 90°, of the journal plate 24 on a longitudinal side of the central part 21, a configuration of the redirecting device 20 is attained which permits a redirection of kinematic planes.

The journal 25 may, owing to its construction, be formed as a precision casting or bent sheet-metal part or else as an MIM part.

FIG. 5 illustrates, as an example of a known exhaust-gas turbocharger, the turbocharger 30 which has an actuator 44 with a control rod 43. Said design represents a known embodiment. The exhaust-gas turbocharger 30 may however be converted into an exhaust-gas turbocharger according to the invention if the actuator 44 with its control rod 43 is exchanged for the actuation device 1 according to the invention explained above in conjunction with FIGS. 1 to 4.

The reference signs used otherwise in FIG. 5 are explained in the following list of reference signs, because a detailed description of the technical features indicated by said reference signs is not necessary for explaining the principles of the present invention.

In addition to the above written disclosure of the invention, reference is hereby explicitly made to the illustrative presentation thereof in FIGS. 1 to 5.

LIST OF REFERENCE SIGNS

1 Actuation device (electric actuator)
2 Housing
3 Shank portion
4 Shielding cap
5 Fastening region
6, 7 First and second cylinder portions
8-11 Cooling and water outlet bores
12 Twist prevention means
12A Rectangular recess region
12B Conical recess region
13 Flanged portion
14 End-side opening
15-17 Recesses
18 Passage openings
19 Transition region
20 Redirecting device
21 Central part
22 End side
23 Connection plate
24 Journal plate
25 Journal
26 Coupling rod
27, 28 Nuts
29 Eyelet
30 Exhaust-gas turbocharger
31 Turbine housing
32 Compressor housing
33 Bearing housing
34 Turbine wheel
35 Shaft
36 Compressor wheel
37 Turbine housing inlet
38 Turbine housing outlet
39 Flap arrangement
40 Flap plate
41 Flap lever/spindle
42 Flap shaft
43 Control rod
44 Actuator
α Right angle

The invention claimed is:

1. An electronic actuation device (1) having
a housing (2); and
an actuation shank, which has a first shank portion guided in the housing (2) and a second shank portion (3) projecting out of the housing (2),
wherein
a shielding cap (4) is provided which is fastened to the housing (2) and which at least partially surrounds the second shank portion (3) with the exception of a fastening region (5),
wherein the shielding cap (4) has cooling and water outlet bores (8, 9, 10, 11).

2. The electronic actuation device as claimed in claim 1, wherein the shielding cap (4) has two interconnected first and second cylinder portions (6, 7) with different diameters (D1, D2).

3. The electronic actuation device as claimed in claim 2, wherein a flanged portion (13) is arranged around an end-side opening (14) of the second cylinder portion (7).

4. The electronic actuation device as claimed in claim 3, wherein the flanged portion (13) is provided with openings (15, 16, 17).

5. The electronic actuation device as claimed in claim 1, wherein the shielding cap (4) is screwed to the housing (2).

6. The electronic actuation device as claimed in claim 1, wherein the fastening portion (5) is connected via a redirecting device (20) to a coupling rod (26).

7. The electronic actuation device as claimed in claim 1, wherein the actuation shank is produced from plastic or metal.

8. An electronic actuation device (1) having
a housing (2); and
an actuation shank, which has a first shank portion guided in the housing (2) and a second shank portion (3) projecting out of the housing (2),
wherein
a shielding cap (4) is provided which is fastened to the housing (2) and which partially surrounds the second shank portion (3) with the exception of a fastening region (5),
the shielding cap (4) has two interconnected first and second cylinder portions (6, 7) with different diameters (D1, D2), and a twist prevention means (12) is formed as an opening in the second cylinder portion (7).

9. The electronic actuation device as claimed in claim 8, wherein the shielding cap (4) has cooling and water outlet bores (8, 9, 10, 11).

10. An exhaust-gas turbocharger (30) having an electronic actuation device (1) which has a housing (2) and an actuation shank which has a first shank portion guided in the housing (2) and a second shank portion (3) projecting out of the housing (2), wherein a shielding cap (4) is provided which is fastened to the housing (2) and which at least partially surrounds the second shank portion (3) with the exception of a fastening region (5),
wherein the shielding cap (4) has cooling and water outlet bores (8, 9, 10, 11).

11. The exhaust-gas turbocharger as claimed in claim 10, wherein the shielding cap (4) has two interconnected first and second cylinder portions (6, 7) with different diameters (D1, D2).

12. The exhaust-gas turbocharger as claimed in claim 11, wherein a flanged portion (13) is arranged around an end-side opening (14) of the second cylinder portion (7).

13. The exhaust-gas turbocharger as claimed in claim 12, wherein the flanged portion (13) is provided with openings (15, 16, 17).

14. The exhaust-gas turbocharger as claimed in claim 10, wherein the shielding cap (4) is screwed to the housing (2).

15. The exhaust-gas turbocharger as claimed in claim 10, wherein the fastening portion (5) is connected via a redirecting device (20) to a coupling rod (26).

16. The exhaust-gas turbocharger as claimed in claim 10, wherein the actuation shank is produced from plastic or metal.

17. An exhaust-gas turbocharger (30) having an electronic actuation device (1) which has a housing (2) and an actuation shank which has a first shank portion guided in the housing (2) and a second shank portion (3) projecting out of the housing (2), wherein a shielding cap (4) is provided which is fastened to the housing (2) and which partially surrounds the second shank portion (3) with the exception of a fastening region (5),
wherein the shielding cap (4) has two interconnected first and second cylinder portions (6, 7) with different diameters (D1, D2), and
wherein a twist prevention means (12) is formed as an opening in the second cylinder portion (7).

18. The exhaust-gas turbocharger as claimed in claim 17, wherein the shielding cap (4) has cooling and water outlet bores (8, 9, 10, 11).

* * * * *